HIGH DEFINITION TELEVISION SYSTEM

Filed Feb. 4, 1955 8 Sheets-Sheet 1

Conventional Picture 525 Lines 3-8 MC
(Lines 481-525 are not visible)

High Definition Picture After Six Frames
(1/5 Second) Definition is 1,140,000 Elements WITNESSES
Robert A. Baird
John J. Callahan INVENTOR
Charles H. Jones.
BY F. E. Browder
ATTORNEY Proposed Picture After First Frame (2 Fields) or 1/30 Second. Definitions is 190,000 Elements.

June 23, 1959 C. H. JONES 2,892,015

HIGH DEFINITION TELEVISION SYSTEM

Filed Feb. 4, 1955 8 Sheets-Sheet 7

2,892,015
Patented June 23, 1959

2,892,015

HIGH DEFINITION TELEVISION SYSTEM

Charles H. Jones, Pittsburgh, Pa., assignor to Westinghouse Electric Corporation, East Pittsburgh, Pa., a corporation of Pennsylvania Application February 4, 1955, Serial No. 486,054

42 Claims. (Cl. 178—5.2)

This invention relates to television systems, and has as an object to increase the definition of television pictures.

The definition of television pictures which is obtainable with present standards using present methods is low. Of the 525 lines in a picture, about 92 percent are visible so that the vertical resolution is about 475. The horizontal sweep rate is 15,750 cycles per second with a horizontal sweep period of 63.5 microseconds. Since the horizontal blanking time is 17 percent, the visible portions of the horizontal trace occur in 52.6 microseconds. With a video bandwidth of 3.8 megacycles, the number of elements in one horizontal sweep is 400 (two elements per cycle). Hence, the total visible picture elements are about 190,000. For comparison, sixteen millimeter motion picture film has 250,000 half-tone dots.

One embodiment of this invention provides a television picture having 1,140,000 elements. This is slightly superior to 35 millimeter motion picture film which has 1,000,000 half-tone dots. This increased definition is accomplished by transmitting slightly different information about the picture in each of six successive pictures. This is accomplished through both horizontal and vertical interlace. A television system embodying this invention is compatible. It will allow existing television receivers to receive the high definition broadcasts, although they will present pictures having the same definition as they do now. The system has reverse compatibility in that high definition television receivers embodying this invention will be able to receive low definition broadcasts as low definition (present standard) pictures.

This invention will now be described with reference to the annexed drawings, of which:

Figure 1:
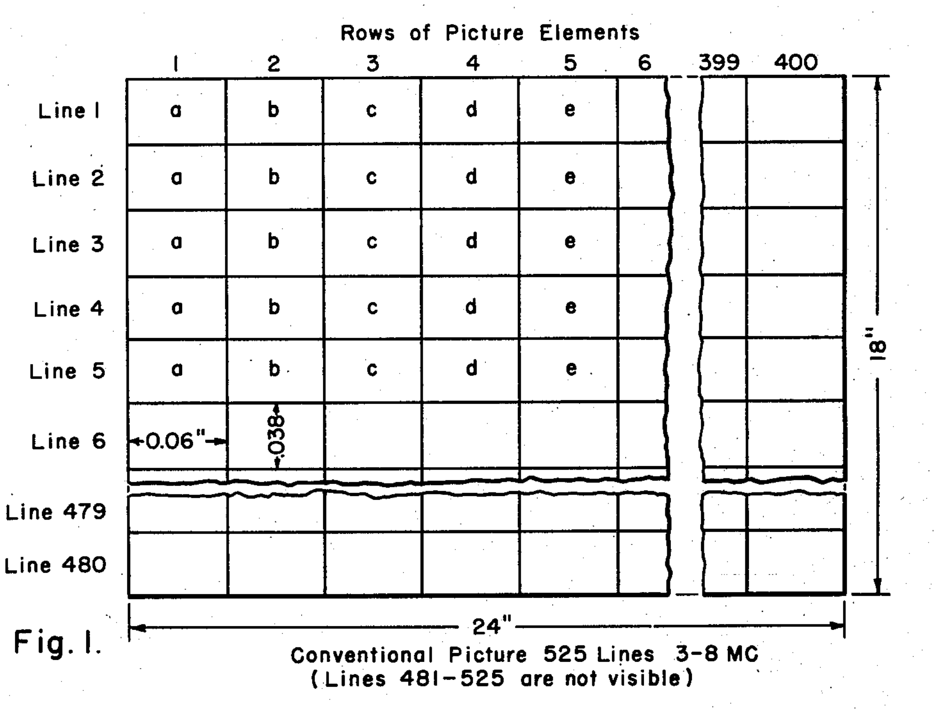
Figure 1 is a chart showing the arrangement of the picture elements of an 18" x 24" picture screen as used in a conventional system.

Referring now to Fig. 1, in a conventional television system, information concerning element *a* is transmitted, followed by element *b*, then element *c*, then element *d* and so on, the odd numbered lines being scanned during the first field and every odd numbered field thereafter, and the even numbered lines being scanned during the second field and every even numbered field thereafter.

Figure 2:
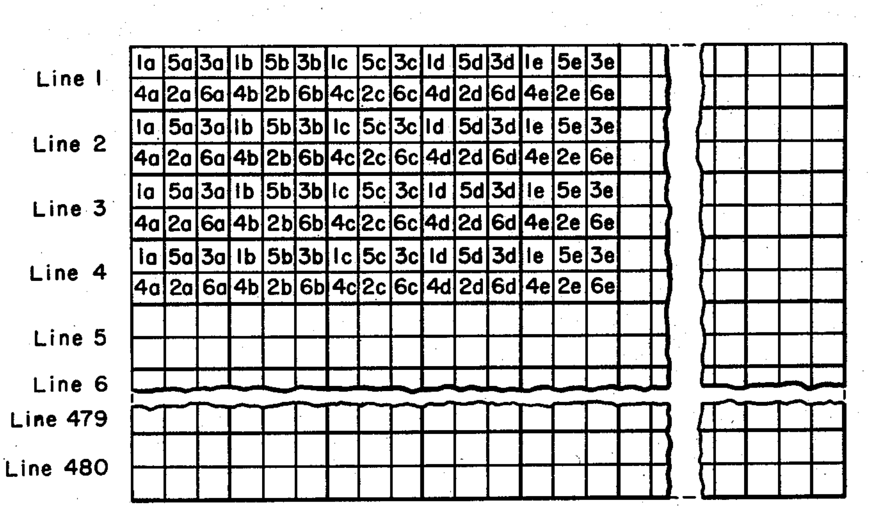
Fig. 2 is a chart similar to that of Fig. 1 but shows the sub-division of the picture elements according to this invention.
Figure 3:
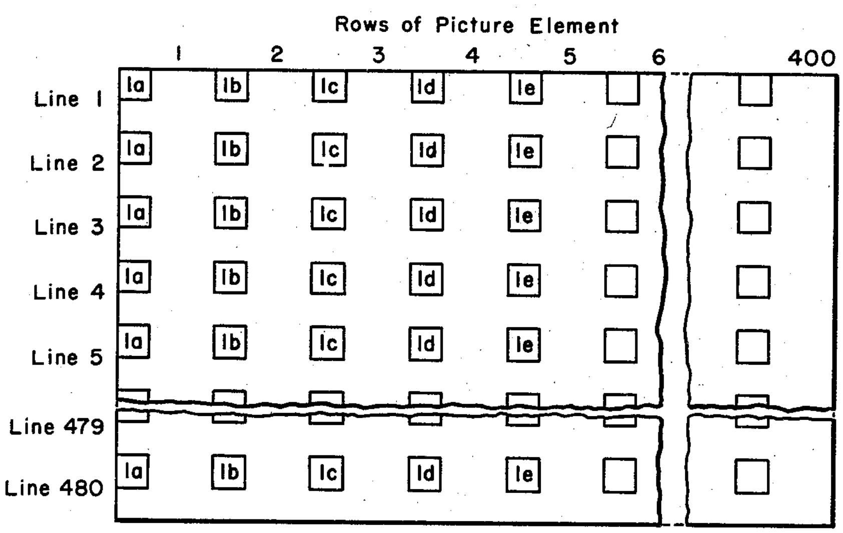
Fig. 3 is a chart showing one of the six pictures which are superimposed according to this invention, to provide a high definition picture.

Referring now to Fig. 2, in a system embodying my invention, each of the picture elements corresponding to those of Fig. 1 is broken into six pieces. While the first field is being swept, information concerning elements 1*a*, 1*b*, 1*c*, 1*d* and so on of line 1 and the other odd numbered lines is transmitted. Since the horizontal sweep rate and the distance between elements are the same as in Fig. 1, the bandwidth will be the same. While the second field is being swept, information concerning elements 1*a*, 1*b*, 1*c*, 1*d* and so on of line 2 and the other even numbered lines is transmitted. Fig. 3, shows the elements that have been swept during the first two fields. Similarly, for the third field, information concerning elements 2*a*, 2*b*, 2*c*, 2*d* and so on of the odd numbered lines is transmitted. Similarly, for the fourth field, information concerning elements 2*a*, 2*b*, 2*c*, 2*d* and so on of the even numbered lines is transmitted. Similarly, for the fifth field, information concerning lines 3*a*, 3*b*, 3*c*, 3*d* and so on of the odd numbered lines is transmitted. Similarly, for the sixth field, information concerning elements 3*a*, 3*b*, 3*c*, 3*d* and so on of the even numbered lines is transmitted. Similarly, for the seventh field, information concerning elements 4*a*, 4*b*, 4*c*, 4*d* and so on of the odd numbered lines is transmitted. Similarly, for the eighth field, information concerning elements 4*a*, 4*b*, 4*c*, 4*d* and so on of the even numbered lines is transmitted. Similarly, for the ninth field, information concerning elements 5*a*, 5*b*, 5*c*, 5*d* and so on of the odd numbered lines is transmitted. Similarly, for the tenth field, information concerning elements 5*a*, 5*b*, 5*c*, 5*d* and so on of the even numbered lines is transmitted. Similarly, for the eleventh field, information concerning elements 6*a*, 6*b*, 6*c*, 6*d* and so on of the odd numbered lines is transmitted. Similarly, for the twelfth field, information concerning elements 6*a*, 6*b*, 6*c*, 6*d* and so on of the even numbered lines is transmitted. The thirteenth field will transmit information concerning elements 1*a*, 1*b*, 1*c*, 1*d* and so on of the odd numbered lines, and will be the same as the first field if the picture has not changed during the intervening one-fifth of a second. In effect, six low definition picture elements of the type shown in Fig. 3 (190,000 elements) have been superimposed to give one high definition picture (1,140,000 elements) as shown in Fig. 2. The horizontal definition will be improved by a factor of $3/\sqrt{2}$, and the vertical definition will be improved by a factor of two.

Conventional receivers will give a picture that is no better or no worse than present. However, high definition receivers embodying my invention will be able to use the added information to give high definition for relatively stationary scenes or portions of scenes. Of course, objects that move a distance of one picture element (large) or more in 1/30 second will not appear in high definition. Since the eye cannot perceive great detail in moving objects, this is not serious.

Figure 4:
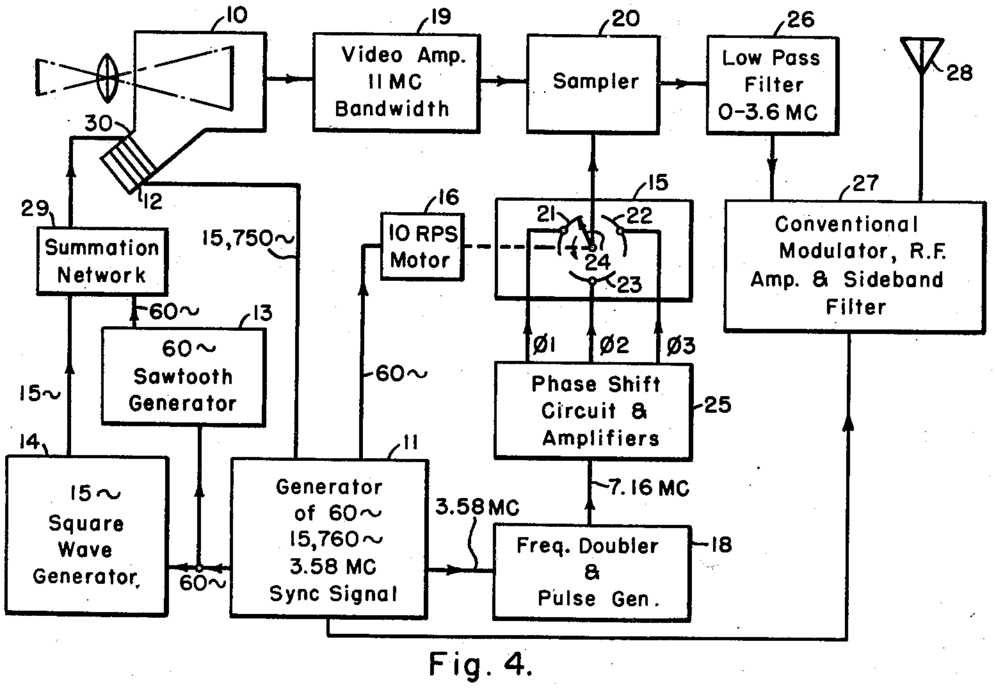
Fig. 4 is a block diagram of a monochrome television transmitter embodying this invention.

Referring now to Fig. 4, the scene to be televised is scanned by a split line scanner 10, which is a conventional camera tube except that it has a smaller spot giving 960 line resolution instead of the customary 480. The top half of each of the 480 visible lines is scanned on the first frame and every odd numbered frame thereafter. The lower half of each of the 480 lines is scanned on the second frame and every even numbered frame thereafter. There are two fields per frame, one for the odd numbered lines and the other for the even numbered lines, as in present standards. The size of the scanning spot is small enough that 11 megacycle video definition is obtained.

A conventional sync pulse generator unit 11 supplies horizontal scanning pulses of 15,750 cycles per second to horizontal deflection coils 12; supplies a 60-cycle per second signal to a 60-cycle per second sawtooth wave generator 13, to a 15-cycle per second square wave generator 14 and to a mechanical switch 15 which is rotated at 10 revolutions per second by a motor 16; and supplies 3.58 megacycle sync pulses to a frequency doubler and pulse generator 18.

The output of the scanner 10 is amplified by an 11 megacycle video amplifier 19 and is applied to a sampler 20. The switch 15 may be an electronic switch. Shown symbolically, it has three switch sectors 21, 22 and 23 which are wiped by a brush 24 at a 10 revolutions per second rate, providing a switching rate of 30 cycles per second, the frame rate. The brush 24 is connected to the sampler 20.

The 7.16 megacycle output of the frequency doubler and pulse generator 18 is applied to the input of a phase shift and amplifier unit 25.

The output of the sampler 20 is passed through a low pass filter 26 and is applied to the standard modulator, radio frequency amplifier and side band filter unit 27, which is connected to a transmitting antenna 28. The sampler 20 is used to sample (measure as to brightness) every third picture element in each horizontal line. The sampler 20 allows the video signal to pass for a time interval which is short compared to the time between pulses, 10 degrees, for example. The sampler also can be considered as a unit which modulates the amplitude of the pulses applied to it in accordance with the instantaneous level of the video signal. The filter 26 reduces the higher harmonics introduced by the sampled pulses. The gate 15 passes a pulse of phase $\phi 1$ for $1/30$ second (fields 1 and 2), then passes a pulse of $\phi 2$ for the next $1/30$ second (fields 2 and 3), and finally a pulse of $\phi 3$ for the next $1/30$ second (fields 3 and 4), after which the sequence is repeated. This permits the passage of information concerning every third picture element in each horizontal line.

Figure 7A:
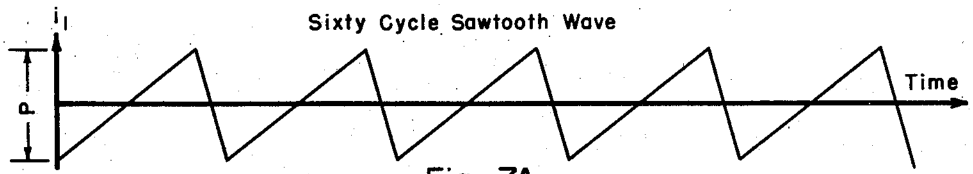
Figs. 7A, 7B and 7C are graphs showing how a 15 cycle square wave added to a 60 cycle sawtooth wave provides the desired waveform for achieving vertical interlace according to this invention.
Figure 7B:
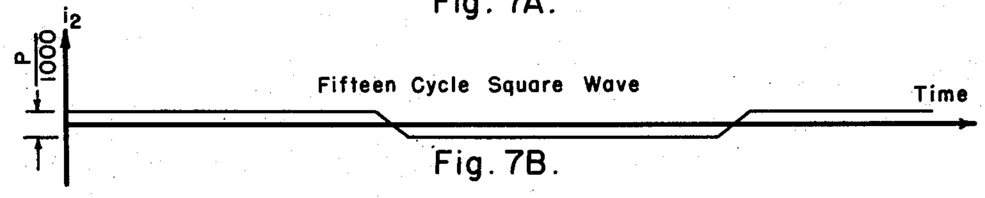
Figure 7C:
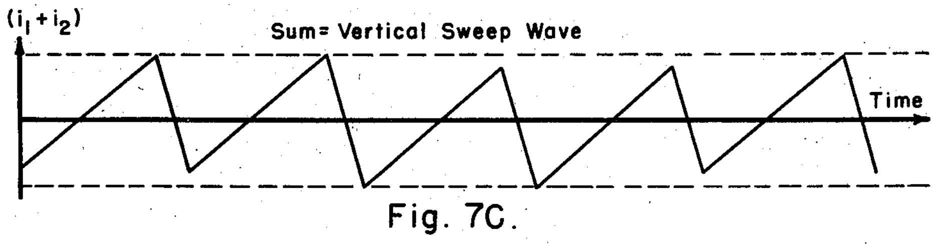

The 60-cycle sawtooth wave generator 13 and the 15-cycle square wave generator 14 are connected to a summation network 29. The outputs from the generators 13 (Fig. 7A) and 14 (Fig. 7B) are combined in the network 29 to provide a vertical deflection signal, as shown by Fig. 7C, which is supplied to vertical deflection coils 30.

Figure 6A:
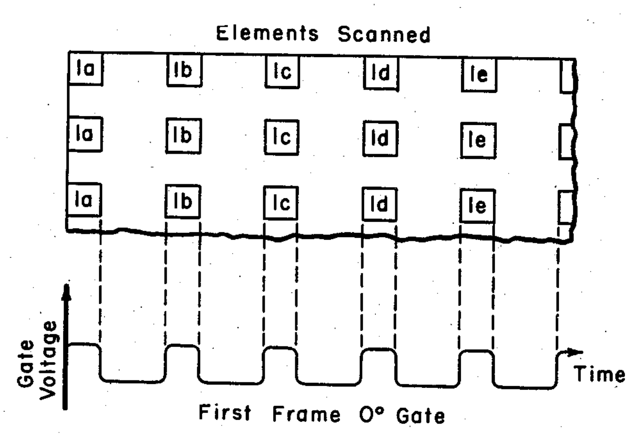
Figs. 6A, 6B and 6C are graphs showing the form of gating signal used at the transmitter of Fig. 4 and at the receiver of Fig. 5 in its relation to the picture elements.
Figure 6B:
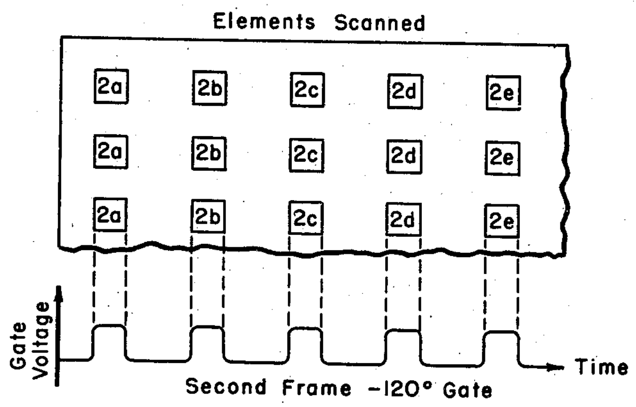
Figure 6C:
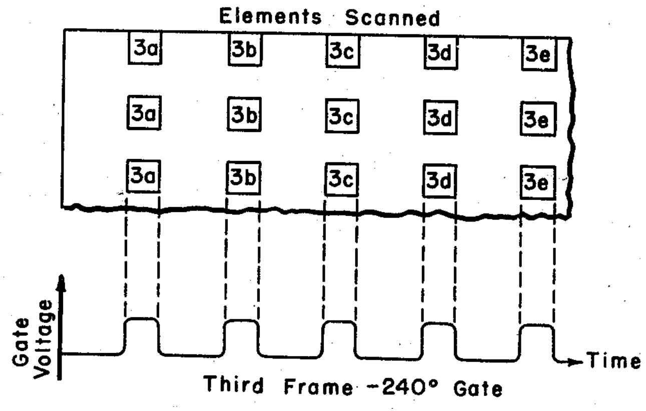

The gating frequency of 7.16 megacycles is a harmonic of the horizontal line frequency of 15,750 cycles per second. With a sampling frequency of this sort, the phase position of the sampling frequency with respect to the beginning of every line is always the same. Hence, it will be necessary to have three outputs from the unit 25 which have phase positions 120° apart. The unit 25 provides positive pulses 120° apart, and the switch 15 changes the phase of the gating pulse applied to the sampler 20 on successive frames as shown in Figs. 6A, 6B and 6C. The gating pulse applied to the sampler 20 may be as large as 120° but a small gate width of 10°, for example, is preferable. During the first frame (0° gate) information concerning elements 1*a*, 1*b*, 1*c*, 1*d* and so on is transmitted. During the second frame (120° gate), information concerning elements 2*a*, 2*b*, 2*c*, 2*d* and so on is transmitted. During the third frame (240° gate), information concerning elements 3*a*, 3*b*, 3*c*, 3*d* and so on is transmitted. On the next rotation of the switch 15, information concerning elements 4*a*, 4*b*, 4*c*, 4*d* and so on will be transmitted during the fourth frame (0° gate again) and so on.

Figure 5:
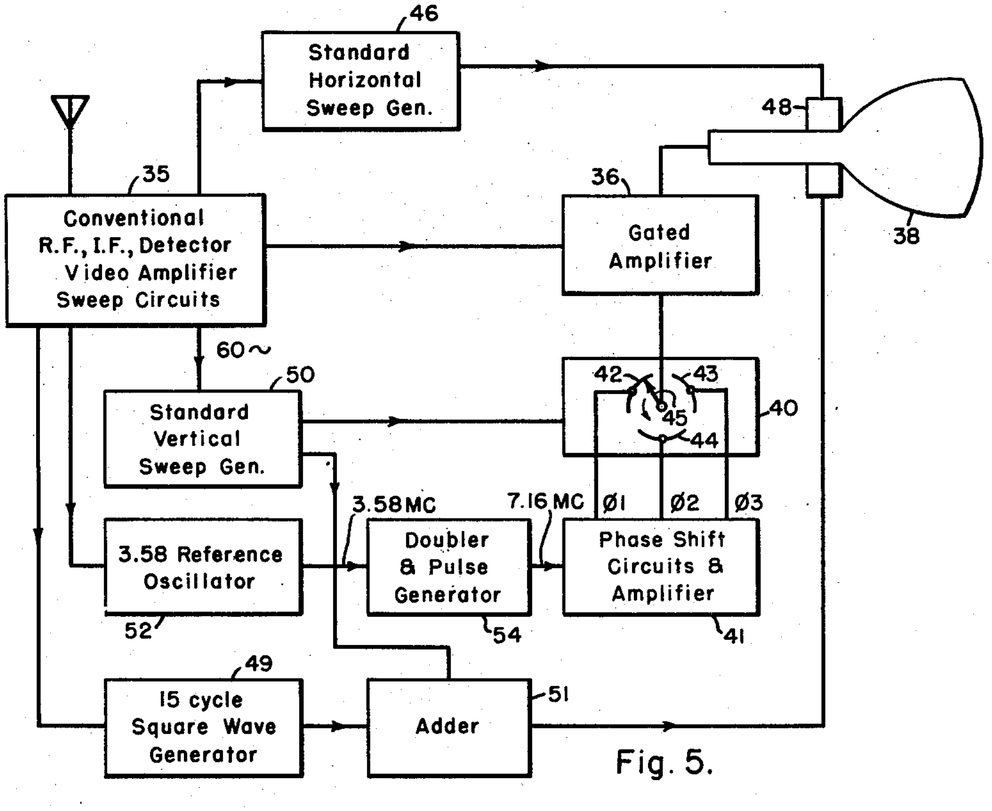
Fig. 5 is a block diagram of a monochrome television receiver embodying this invention.

In this transmitter and in the monochrome receiver of Fig. 5, the 3.58 megacycle synchronizing signal may be transmitted on the back porch of the horizontal blanking signal as is done with a National Television System Committee (NTSC) color signal.

Fig. 5 illustrates a monochrome television receiver embodying this invention and designed to receive the high definition pictures from the transmitter of Fig. 4. The video signal from the receiver unit 35 which is conventional up through the video second detector, is supplied through a gated amplifier 36 to the control grid of a picture tube 38. The amplifier 36 is gated by an electronic switch 40 which is connected between the amplifier 36 and a phase shift and amplifier unit 41. The electronic switch 40, shown symbolically, has three switch sectors 42, 43 and 44 which are wiped in succession by the rotary brush 45 which rotates at a 10 cycle per second rate, and which is synchronized with the corresponding brush 24 at the transmitter, and which changes the phase of the gating signal on successive frames as shown by Figs. 6A, 6B and 6C.

Sync signals from the receiver unit 35 are supplied to a standard horizontal sweep generator 46 which is connected to the deflection yoke 48 of the picture tube 38. Sync signals are also applied to a 15-cycle square wave generator 49 and a standard vertical sweep generator 50, the outputs of the generators 49 and 50 being added in the summation network 51 and applied as a 15 cycle per second vertical deflection signal to the yoke 48. This 15 cycle per second vertical deflection signal is produced as shown by Fig. 7B. A 15-cycle square wave is added to the usual 60-cycle sawtooth vertical sweep wave providing the desired wave form. For two fields, the vertical sweep pattern is displaced upwardly by a small amount, and in the next two fields is displaced downwardly by the same amount.

Sync signals from the receiver unit 35 are also supplied to a 3.58 megacycle reference oscillator 52 which is connected to a frequency doubler and pulse generator unit 54. The unit 54 supplies a 7.16 megacycle signal to the phase shift and amplifier unit 41. The unit 41 delivers three 7.16 megacycle gating signals, 120° apart in phase, to each of the three switch sectors 42, 43 and 44 of the electronic gating switch 40. The wave forms of these three signals are shown in Figs. 6A, 6B and 6C.

The grid of the picture tube is gated so that it is on only one-third of the time during element scanning, and so in any field reproduces every third picture element only in each line.

The 15-cycle square wave generator provides a vertical interlace ratio of 4 at a frame frequency of 15 cycles, while the gated 7.16 megacycle signal provides a horizontal interlace ratio of 3 for providing a picture as shown by Fig. 2.

The switch 15 at the transmitter is synchronized with the switch 40 at the receiver for changing the phase of the gating signal on successive frames. Likewise the 15-cycle square wave generator 14 at the transmitter is synchronized with the 15-cycle square wave generator 49 at the receiver. This synchronization can be accomplished by using the 60-cycle vertical sweep signal that is used to synchronize the vertical sweep in conventional receivers. Proper phasing of the 10 cycle and the 15 cycle signal can be achieved in a number of ways which are well known for synchronizing field sequential color signals at a frequency which is a sub-multiple of the field rate. One method consists of a button at a receiver that is pushed to unlock the signal if it locks in on the wrong phase. This button is pushed a number of times until the proper phasing is obtained. For example, there is one chance in four in locking a 15 cycle signal with a 60 cycle signal in the proper phase at the first attempt. Another method is to transmit some special equalizing pulses during vertical retrace every fourth field (15 cycle sync) and every sixth field (10 cycle rate). From these equalizing pulses suitable syncs are obtained. Such a method is described on pages 508–513 of "Television Engineering" by Donald G. Fink, published by McGraw-Hill Book Company.

One consideration in this high definition system is the loss of light output. The spot height is reduced by one-half, its width is reduced by one-third. As can be seen from Fig. 6, the beam is on for only one-third of the time. Therefore, for the same beam current density the light output would be down by a factor of 18. One technique which will improve this situation by a factor of 3 is to apply a stepping voltage to the horizontal sweep instead of gating the grid of the picture tube. A high frequency sawtooth wave applied to a pair of deflection plates within the picture tube will give approximately the step waveform of Fig. 10. This technique will be described in connection with Figs. 8 and 9 as applied to a color television receiver, but it could be applied to the monochrome receiver of Fig. 5.

Figure 8:
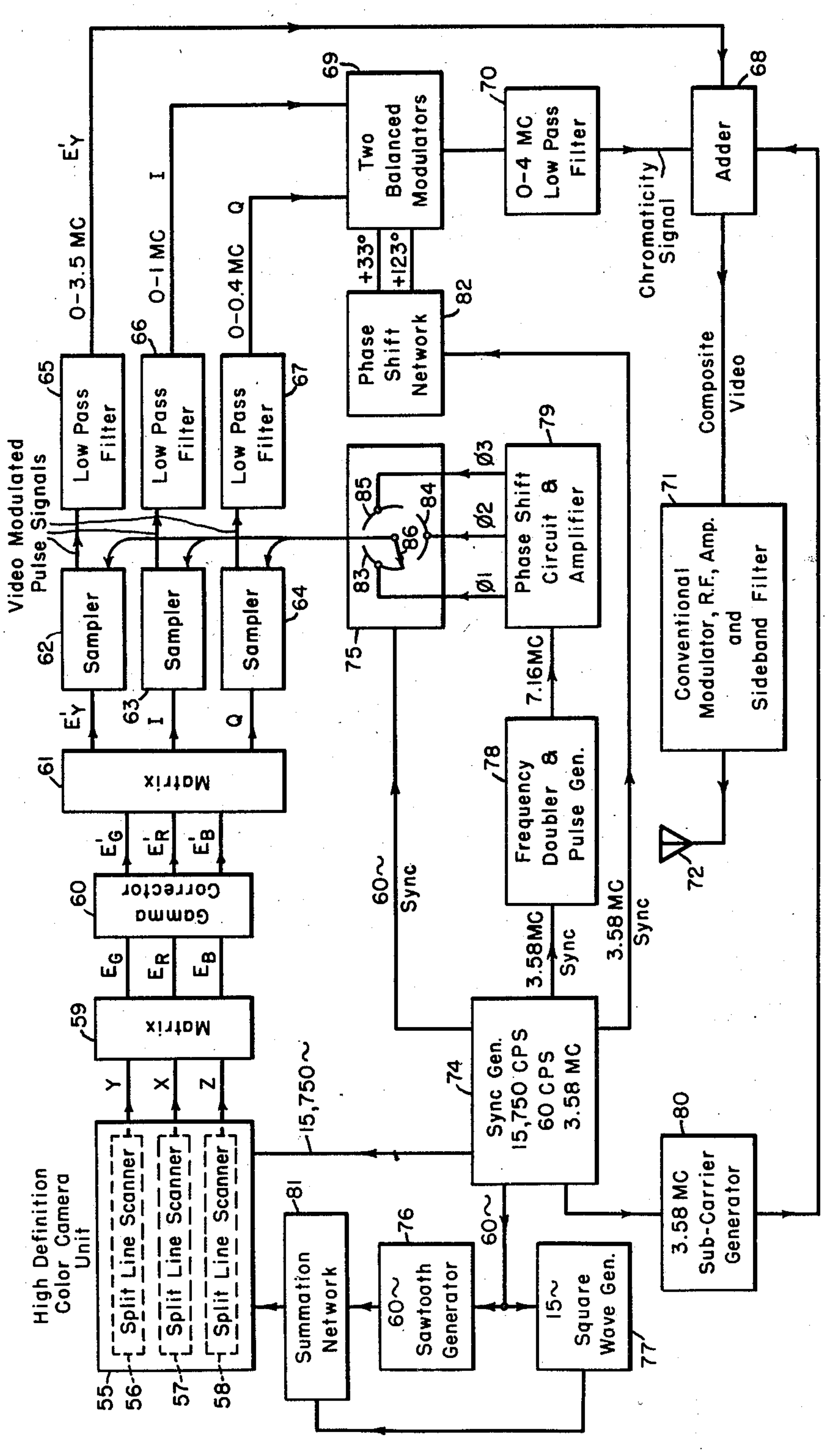
Fig. 8 is a block diagram of a color television transmitter embodying this invention.

Referring now to Fig. 8, a high definition color television transmitter embodying my invention will be described. In this transmitter and in the high definition color receiver of Fig. 9, horizontal interlace is achieved by using the second harmonic of the 3.58 megacycle color reference signal that is transmitted in bursts during horizontal blanking time according to NTSC standards. Vertical interlace is achieved by using a 15-cycle square wave combined with the usual 60-cycle sawtooth wave as in Figs. 4 and 5.

A high definition color camera unit 55 of Fig. 8, which contains three split line color scanners 56, 57 and 58, is connected to a conventional matrix 59 which converts the X, Y and Z signals into green, red and blue signals respectively, and supplies them into a conventional gamma correction unit 60. The unit 60 is followed by a conventional matrix 61 which converts the color signals into the brightness and the I and Q signals which are supplied into samplers 62, 63 and 64, respectively.

The sampler 62 is connected through a 0–3.5 megacycle low pass filter 65 to the adder 68. The sampler 63 is connected through a 0–1 megacycle filter 66 into one of two balanced modulators in a modulator unit 69. The sampler 64 is connected through a 0–0.4 megacycle filter 67 to the other balanced modulator in the unit 69. The output of the modulator unit 69 is supplied through a 0–4 megacycle filter 70 into the adder 68 which is connected through the conventional RF modulator, RF amplifier and side band filter unit 71 to the transmitting antenna 72.

A conventional sync pulse generator unit 74 supplies horizontal scanning pulses of 15,750 cycles per second to the camera unit 55; supplies a 60-cycle signal to the mechanical or electronic switch 75, to a 60-cycle per second sawtooth wave generator 76 and to a 15-cycle per second square wave generator 77; and supplies 3.58 megacycle sync pulses to a frequency doubler and pulse generator 78 and to a phase shift network 82, and supplies sync signals to a 3.58 megacycle burst generator 80 which supplies composite sync with a 3.58 megacycle subcarrier in the adder 68. The network 82 delivers two signals, one having a phase angle of +33° and the other having a phase angle of +123°, to the modulator unit 69.

The 60-cycle sawtooth wave generator 76 and the 15-cycle square wave generator 77 are connected to a summation network 81. The network 81 is connected to the camera unit 55.

The electronic gating switch 75 shown symbolically, has the switch sectors 83, 84 and 85 which are wiped in succession by the brush 86 driven at a 10 revolutions per second rate. The brush 86 is connected to the samplers 62, 63 and 64.

The 7.16 megacycle output of the frequency doubler and pulse generator unit 78 is applied to the input of the phase shift and amplifier unit 79 which delivers an in-phase 7.16 megacycle signal to the switch sector 83; which delivers a 120° 7.16 megacycle signal to the sector 84, and which delivers a 240° 7.16 megacycle signal to the sector 85.

The gating frequency of 7.16 magacycles which is the second harmonic of the 3.58 megacycle color reference signal is delivered to the samplers 62, 63 and 64, 120° apart in phase. This gating frequency is also an exact harmonic of the 30-cycle frame rate. The gate 75 is on for 120° and off for 240° with its phase changed every frame, as shown by Figs. 6A, 6B and 6C, and provides horizontal interlace. Vertical interlace is achieved with the 15-cycle square wave generator 77 and the 60-cycle sawtooth wave generator 76.

Figure 9:
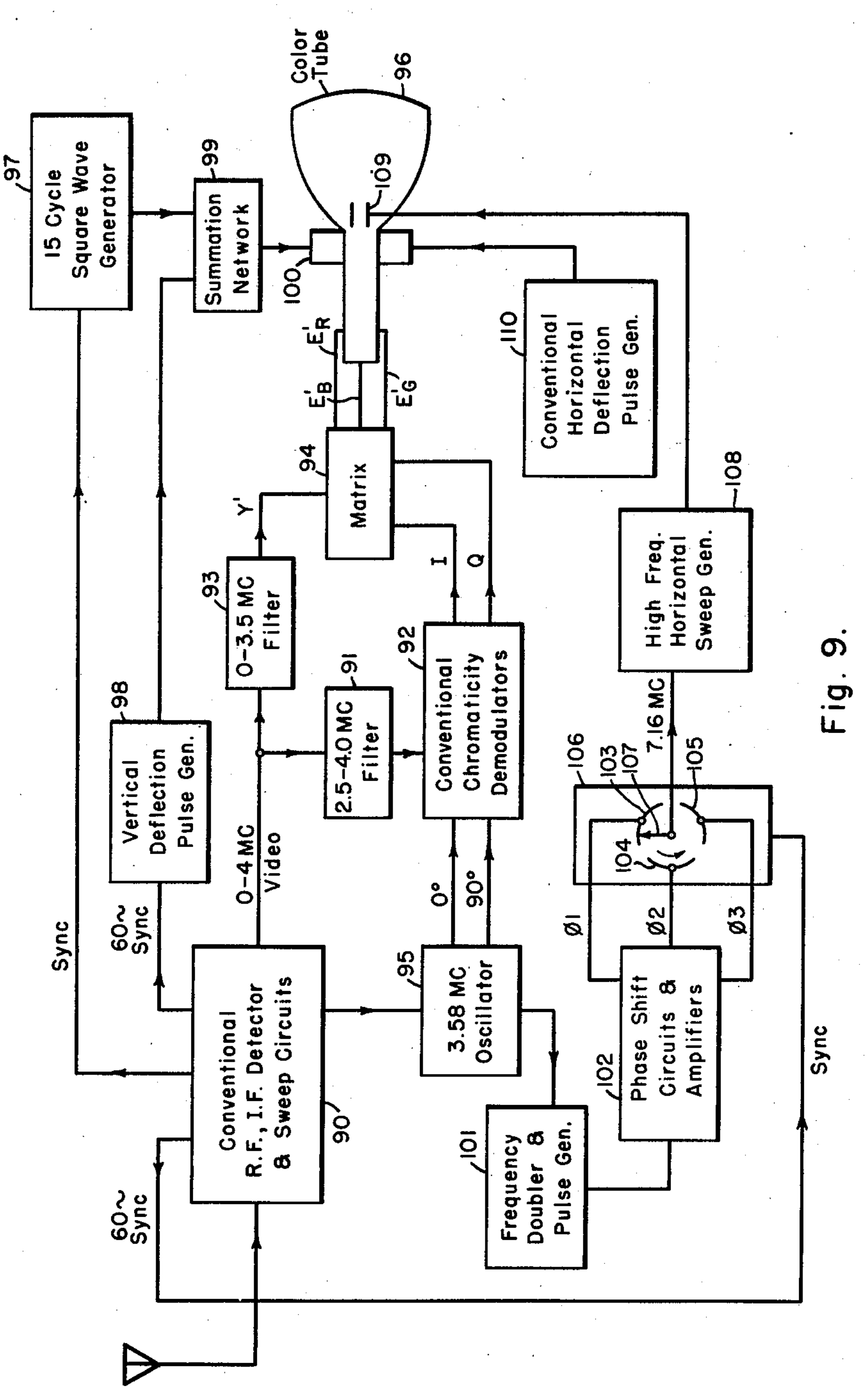
Fig. 9 is a block diagram of a color television receiver embodying this invention.
Figure 10A:
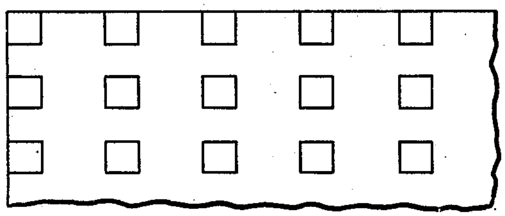
Figs. 10A–10D show the stepping voltage utilized in the picture tube of Fig. 9 in its relation to the scanned picture elements.
Figure 10B:
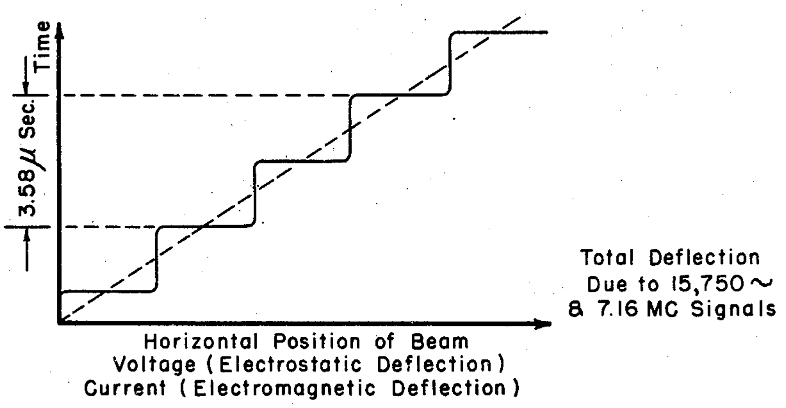
Figure 10C:
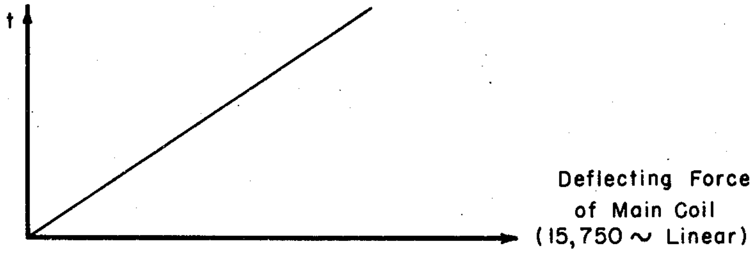
Figure 10D:
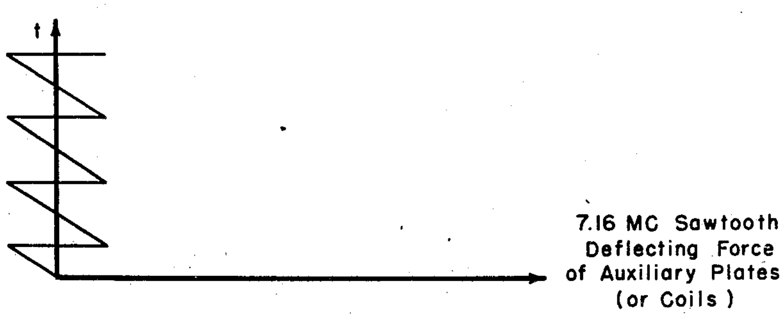

Fig. 9 illustrates a color television receiver embodying my invention and designed to receive color signals from the transmitter of Fig. 8. A receiver 90 which is conventional up through the picture second detector delivers a video signal through a conventional 2.5–4.0 megacycle filter 91 to a conventional chromaticity demodulator 92, and through a conventional 0–3.5 megacycle filter 93 to a conventional matrix unit 94. Sync bursts from the receiver 90 are supplied to the 3.58 megacycle reference oscillator 95 to the demodulators 92. The demodulators 92 deliver the I and Q signals to the matrix 94 where the three primary color signals are derived and supplied to the three color guns of the color tube 96.

A sync signal from the receiver 90 is applied to a 15-cycle square wave generator 97 for synchronizing it with the 15-cycle square wave generator 77 at the transmitter of Fig. 8. The receiver 90 also delivers a 60-cycle vertical sync signal to the vertical oscillator 98 which delivers a 60-cycle signal to the adder or summation network 99. The 15-cycle square wave from the generator 97 and the 60-cycle sawtooth wave from the oscillator 98 are combined in the adder 99 to provide the 15 cycle per second vertical deflection signal shown by Fig. 7C, which is supplied to the deflection yoke 100.

The 3.58 megacycle reference oscillator 95 is connected to a frequency doubler and pulse generator 101 which is, in turn, connected to a phase shift and amplifier unit 102. The unit 102 delivers a 7.6 megacycle gating signal, 120° apart in phase, to each of three switch sectors 103, 104 and 105 of the electronic gating switch 106, which is shown symbolically. A brush 107 of the switch is rotated at a 10 revolutions per second rate and is synchronized at that rate with the corresponding switch 75 at the transmitter of Fig. 8 by a sync signal from the receiver 90. The 7.16 megacycle signal output from the switch 106 is connected to a high frequency horizontal sweep generator 108 which generates a 7.16 megacycle sawtooth voltage wave which is applied to a set of deflection plates 109. The conventional horizontal oscillator 110 is connected to the horizontal coils of the deflection yoke 100. The combination of the linear 15,750 cycle horizontal sweep (Fig. 10C) and the 7.16 megacycle sawtooth wave form (Fig. 10D) produces a stair-step sweep of the form shown in Fig. 10B.

The grids of the picture tube 96 are not gated as is the grid of the picture tube of Fig. 5, but instead a 7.16 megacycle sawtooth wave voltage generated by the unit 108 is applied to the deflection plates 109. By using a 7.16 megacycle current wave instead of a voltage wave, auxiliary deflection coils instead of the plates 109 could be used.

In the practice of this invention, the following facts should be kept in mind. The gating frequency should be at least twice the highest frequency that can be transmitted in the available bandwidth. In a conventional NTSC type of broadcast with 3 to 4 megacycles of horizontal resolution in intensity and 0.5 to 1 megacycle of horizontal resolution in color, my system will improve both the horizontal resolution in intensity and color by a factor of 3 (assuming a 120° gate). The vertical resolution in both intensity and color will be doubled.

While in the foregoing, television systems using horizontal and vertical interlace with a particular gating period and a particular vertical switching rate have been described, other forms of horizontal and vertical interlace can be accomplished by using other gating periods and other vertical switching rates. For example, instead of gating the signal on for one-third of the time as described in the foregoing, it can be gated on for ½, ⅓, ¼, ⅕ or ⅙ the time. Below is a table comparing a conventional color system with my system with various interlace ratios using the 3.58 megacycle color sub-carrier and its second harmonic to achieve proper horizontal interlace.

cluding means for changing the phase of the gating pulses on successive frames, means including means connected to said sampler and said reference generator for transmitting the video signal from said sampler and sync pulses from said generators within a predetermined bandwidth, and a receiver for receiving the transmitted signals, said receiver including means for deriving a demodulated video signal, a second gating pulse generator having the same frequency as said first mentioned gating pulse generator and synchronized therewith, second gating means including means for changing the phase of the gating pulses from said second gating pulse generator on successive frames and synchronized with said first mentioned gating means, a picture tube, and means including vertical and horizontal deflection means and means using signals from said video signal deriving means and said second gating means to reproduce picture

*Comparison table of various interlace*

[Ratios using the 3.58 mc. color subcarrier and its second harmonic to achieve proper horizontal interlace]

| | Interlace Ratio | | Transmitted Video Band Width | | Fields to Complete Picture | Hor. Gating | | Vert. Switching, Rate, c.p.s. | Definition | | | |
|---|---|---|---|---|---|---|---|---|---|---|---|---|
| | | | | | | | | | Horizontal | | Vertical | |
| | Hor. | Vert. | Y | Color | | Rate | on period, percent | | Y | Color | Y | Color |
| Conventional | 1 | 2 | 3.5 | 0.5 | 2 | -------- | 100 | ---------- | 370 Lines | 53 Lines | 340 Lines | 340 Lines. |
| Proposed A | 2 | 2 | {3.58<br>7.16} | 0.5 | 4 | 7.12 | 50 | None | 520 Lines | 106 Lines | 340 Lines | 340 Lines. |
| Proposed B | 2 | 4 | 3.5 | 0.5 | 8 | 7.12 | 50 | 60/2 | 520 Lines | 106 Lines | 680 Lines | 680 Lines. |
| Proposed C | 3 | 4 | 3.5 | 0.5 | 12 | 7.12 | 33 | 60/2 | 780 Lines | 159 Lines | 680 Lines | 680 Lines. |

Figure 11A:
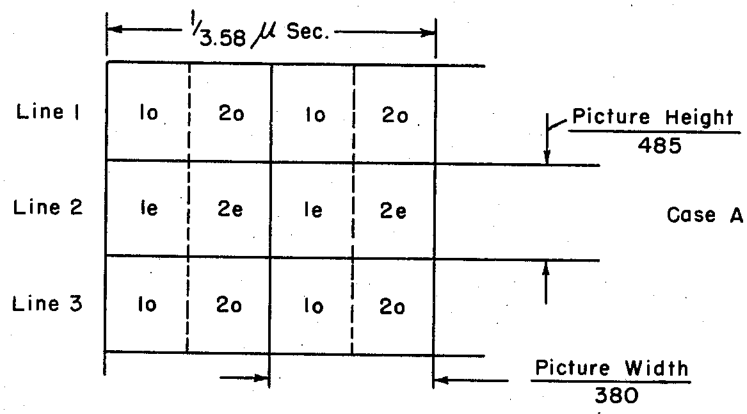
Figs. 11A, 11B and 11C are tables showing the size, shape and positions of elementary picture areas with various interlace ratios.
Figure 11B:
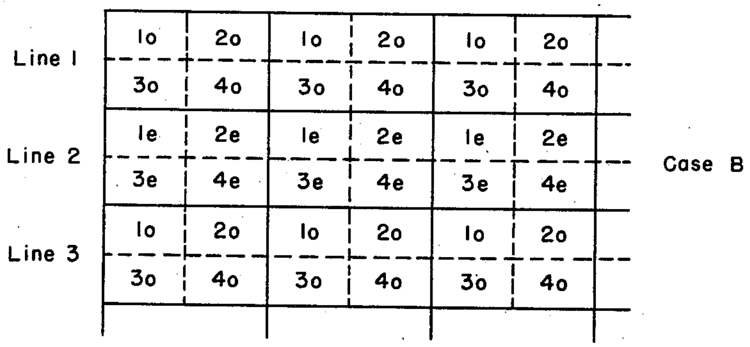
Figure 11C:
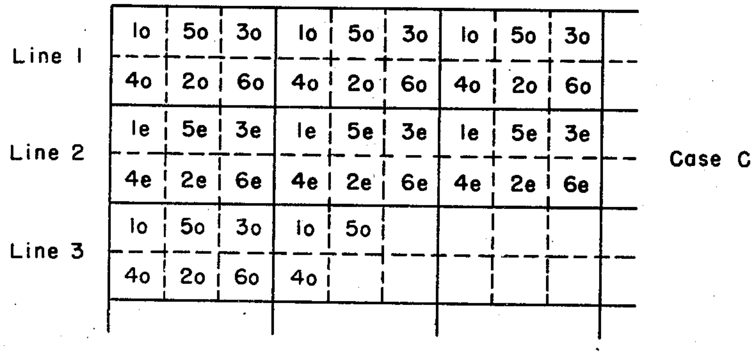

Figs. 11A, 11B, 11C are tables comparing the relative size, shape and position of elementary picture areas for the interlace ratios shown by the above table, the proposed case C in the above table and the table of Fig. 11C being the one described in the foregoing in connection with Figs. 8 and 9. The number of picture elements that can be reproduced is about 15% or 30% less than the actual lines or spots. The reason for this is explained in "Principles of TV Engineering" by Fink, 1940, chapter I, section 7. This factor is taken into account in the table set forth above so that the columns labeled "Definition" give a measure of the actual number of picture elements that can be accurately reproduced.

In the proposed case A of the above table and the table of Fig. 11A, there is no vertical interlace, the gating frequency would be 3.58 megacycles, and the horizontal gating is on 50% of the time. The same vertical definition is obtained as in a conventional system, but the horizontal definition is improved. In the proposed case B of the above table and the table of Fig. 11B, the vertical switching rate is the same as in case C, while the horizontal gate is on for 50% of the time and the gating frequency is the same as in case A. The same horizontal definition as in case A is obtained, and the same vertical definition as in case C is obtained. Other gating rates, gating frequencies, and switching periods could be used.

While I have shown my invention in several forms, it will be obvious to those skilled in the art that it is not so limited, but is susceptible of various other changes and modifications without departing from the spirit and scope thereof.

I claim as my invention:

1. A high definition television system comprising a scanner, line and field frequency generators connected to said scanner, a sampler connected to said scanner, a reference generator having a frequency which is an odd multiple of one-half the frequency of said line generator connected to a gating pulse generator, said gating pulse generator having a frequency which is a multiple of said reference generator, means for gating said sampler with pulses from said generator, said gating means including means for changing the phase of the gating pulses on successive frames, means including means connected to said sampler and said reference generator for transmitting the video signal from said sampler and sync pulses from said generators within a predetermined bandwidth, and a receiver for receiving the transmitted signals, said receiver including means for deriving a demodulated video signal, a second gating pulse generator having the same frequency as said first mentioned gating pulse generator and synchronized therewith, second gating means including means for changing the phase of the gating pulses from said second gating pulse generator on successive frames and synchronized with said first mentioned gating means, a picture tube, and means including vertical and horizontal deflection means and means using signals from said video signal deriving means and said second gating means to reproduce picture elements on the screen of said picture tube only during gating pulses from said second gating means.

2. A television system as claimed in claim 1 in which the scanner is a split line scanner and in which a square wave generator having a frequency which is a submultiple of the field frequency is connected to said scanner for providing vertical interlace, and in which a second square wave generator having the same frequency as said first mentioned square wave generator and synchronized therewith is connected to said vertical deflection means at said picture tube.

3. A television system as claimed in claim 1 in which the means using signals from the second gating means to reproduce picture elements comprises auxiliary horizontal deflection means at said picture tube.

4. A television system as claimed in claim 1 in which the means using signals from the second gating means and from said video signal deriving means is connected to the control grid of the picture tube.

5. A television system as claimed in claim 4 in which the scanner is a split line scanner and in which a square wave generator having a frequency which is a submultiple of the field frequency is connected to said scanner for providing vertical interlace, and in which a second square wave generator having the same frequency as said first mentioned square wave generator and synchronized therewith is connected to said vertical deflection means at said picture tube.

6. A high definition color television system comprising a color camera unit, a line, a field and color sync burst frequency generator unit connected to said camera unit, a color subcarrier generator connected to said generator unit, a gating pulse generator connected to said generator unit and having a frequency which is a harmonic of the color sync burst frequency, gating means connected to said gating pulse generator, said gating means including means for changing the phase of the gating pulses on successive frames, means connected to said camera unit for providing color signals, samplers connected to said last mentioned means and said gating means, means including means connected to said samplers and said subcarrier generator for transmitting the composite video and sync signals within a predetermined bandwidth, and a receiver for receiving the transmitted signals, said receiver including a local oscillator having the same frequency as said color sync burst generator and synchronized therewith, a second gating pulse generator having the same frequency as said first mentioned gating pulse generator and synchronized therewith connected to said local oscillator, second gating means including means for changing the phase of the gating pulses from said second generator on successive frames, means for deriving demodulated color signals, a color picture tube, and means including vertical and horizontal deflection means and means using signals from said deriving means and said second gating means to reproduce picture elements on the screen of said color tube only during gating pulses from said second gating means.

7. A television system as claimed in claim 6 in which the camera unit comprises split line color scanners, in which a square wave generator having a frequency which is a sub-multiple of the field frequency is connected to said camera unit for providing vertical interlace of the color signals from said scanners, and in which a second square wave generator having the same frequency as said first mentioned square wave generator and synchronized therewith is connected to vertical deflection means at said picture tube.

8. A television system as claimed in claim 7 in which the means using signals from said second gating means to reproduce picture elements comprising auxiliary horizontal deflection means at said picture tube.

9. A television system as claimed in claim 6 in which the means using signals from said second gating means to reproduce picture elements comprises auxiliary horizontal deflection means at said color picture tube.

10. A television system as claimed in claim 1 in which the first mentioned gating means includes an electronic switch which changes the phase of the gating signal from the first mentioned gating pulse generator 120° on successive frames, and in which the second mentioned gating means includes an electronic switch synchronized with said switch and which changes the phase of the gating signal from the second gating pulse generator 120° on successive frames.

11. A television system as claimed in claim 10 in which the scanner is a split line scanner and in which a 15 cycle square wave generator is connected to said scanner for providing vertical interlace, and in which a second 15 cycle square wave generator synchronized with said first mentioned 15 cycle generator and synchronized therewith is connected to said vertical deflection means at said picture tube.

12. A television transmitter comprising a scanner, line and field frequency generators connected to said scanner, a sampler connected to said scanner, a reference generator having a frequency which is an odd multiple of one-half the frequency of said line generator connected to a gating pulse generator, said gating pulse generator having a frequency which is a multiple of said reference generator, means for gating said sampler with pulses from said gating pulse generator, said gating means including means for changing the phase of the gating pulses on successive frames, and means including means connected to said sampler and said reference generator for transmitting the video signal from said sampler and sync pulses from said generators within a predetermined bandwidth.

13. A television transmitter as claimed in claim 12 in which the scanner is a split line scanner, and in which a square wave generator having a frequency which is a sub-multiple of the field frequency is connected to said scanner for providing vertical interlace.

14. A television receiver comprising means for receiving a modulated carrier and deriving video signals and sync pulses therefrom, a sampler connected to said means, a reference generator connected to a gating pulse generator, said reference generator having a frequency which is an odd multiple of one-half the line frequency, and said gating pulse generator having a frequency which is a multiple of said reference generator, gating means connected to said gating pulse generator, said gating means including means for changing the phase of the gating pulses applied to said sampler on successive frames, a picture tube having vertical and horizontal deflection means, and means including said deflection means and means using video signals and sync pulses from said first mentioned means and using gating pulses from said gating means for reproducing picture elements on the screen of said tube only during gating pulses from said gating means.

15. A television receiver as claimed in claim 14 in which a square wave generator having a frequency which is a sub-multiple of the field frequency is connected to said vertical deflection means.

16. A television receiver as claimed in claim 15 in which the square wave generator has a frequency of 15 cycles per second.

17. A television receiver as claimed in claim 16 in which the gating means changes the phase of the gating pulses 120° on successive frames.

18. A television transmitter as claimed in claim 12 in which the gating means changes the phase of the gating pulses 120° on successive frames.

19. A television transmitter as claimed in claim 18 in which the scanner is a split line scanner, and in which a square wave generator having a frequency which is a sub-mupltiple of the field frequency is connected to said scanner for providing vertical interlace.

20. A television transmitter as claimed in claim 19 in which the square wave generator has a frequency of 15 cycles per second.

21. A color television transmitter comprising a color camera unit, line, field and color sync burst generators connected to said unit, a color sub-carrier generator connected to said generator unit, a gating pulse generator connected to said burst generator and having a frequency which is a harmonic of the color sync burst frequency, gating means connected to said gating pulse generator, said gating means including means for changing the phase of the gating pulses on successive frames, means connected to said camera unit for providing color signals, samplers connected to said last mentioned means and said gating means, and means connected to said samplers and sadi sub-carrier generator for transmitting the composite video and sync signals, said last-mentioned means including means for removing from said composite video signal the signal components corresponding to the frequency of said gating pulse generator.

22. A television transmitter as claimed in claim 21 in which the camera unit includes split line color scanners, and in which a square wave generator having a frequency which is a sub-multiple of the field frequency is connected to said camera unit for providing vertical interlace.

23. A television transmitter as claimed in claim 22 in which the frequency of the square wave generator is 15 cycles per second.

24. A television transmitter as claimed in claim 23 in which the gating means changes the phase of the gating pulses 120° on successive frames.

25. A television transmitter as claimed in claim 21 in which the gating means changes the phase of the gating pulses 120° on successive frames.

26. A television transmitter as claimed in claim 25 in which the camera unit includes split line color scanners, and in which a square wave generator having a frequency which is a sub-multiple of the field frequency is conencted to said camera unit for providing vertical interlace.

27. A color television receiver comprising means for receiving a modulated carrier and deriving color signals and sync pulses therefrom, a reference oscillator having a frequency which is an odd multiple of one-half the line frequency connected to said first-mentioned means, a gating pulse generator having a frequency which is a multiple of said reference oscillator connected to said reference oscillator, gating means connected to said gating pulse generator, samplers connected to said gating means and said first mentioned means, said gating means including means for changing the phase of the gating pulses applied to said samplers on successive frames, a color picture tube having vertical and horizontal deflection means, and means using said deflection means and using color signals and pulses from said gating means for reproducing picture elements on the screen of said color tube only during gating pulses from said gating means.

28. A color television receiver as claimed in claim 27 in which a square wave generator having a frequency which is a sub-multiple of the field frequency is connected to said vertical deflection means.

29. A color television receiver as claimed in claim 28 in which the frequency of the square wave generator is 15 cycles per second.

30. A color television receiver as claimed in claim 29 in which means using gating pulses from said gating means for reproducing picture elements only during gating pulses comprises auxiliary horizontal deflection means.

31. A color television receiver as claimed in claim 27 in which the means using gating pulses from said gating means for reproducing picture elements only during gating pulses comprises auxiliary deflection means.

32. A color television receiver as claimed in claim 31 in which a square wave generator having a frequency which is a sub-multiple of the field frequency is connected to said vertical deflection means.

33. A color television receiver as claimed in claim 32 in which the frequency of the gating pulse generator is the second harmonic of the local oscillator frequency.

34. A color television receiver as claimed in claim 27 in which the frequency of the gating pulse generator is the second harmonic of the local oscillator frequency.

35. A television receiver comprising means for receiving a modulated carrier and for deriving therefrom video and sync signals, a picture tube having vertical and horizontal deflection means, means for applying said video signals to said picture tube and said sync signals to said deflection means, said tube having auxiliary horizontal deflection means, a reference generator connected to a gating pulse generator, said reference generator having a frequency which is an odd multiple of one-half the line frequency and said gating pulse generator having a frequency which is a multiple of said reference generator, gating means connected to said gating pulse generator, and means connecting said gating means to said auxiliary deflection means.

36. A television receiver as claimed in claim 35 in which a square wave generator having a frequency which is a sub-multiple of the field frequency is connected to said vertical deflection means.

37. A color television receiver comprising means for receiving a modulated carrier and for deriving therefrom color and sync signals, a color picture tube having vertical and horizontal deflection means, means for applying said color signals to said picture tube and said sync signals to said deflection means, said tube having auxiliary horizontal deflection means, a local reference oscillator connected to said first mentioned means, said oscillator having a frequency which is an odd multiple of one-half the line frequency, gating means including means for generating a gating signal having a frequency which is the second harmonic of the frequency of said oscillator, and means for applying said gating signal to said auxiliary deflection means.

38. A color television receiver as claimed in claim 37 in which a 15 cycle per second square wave generator is connected to said vertical deflection means.

39. In an electron beam scanning system having an explored surface defined by a plurality of similar groups of elemental areas; means for generating an electron scanning beam; means for horizontally and vertically deflecting said beam in synchronism with a line and field frequency respectively, with two fields per frame; means for periodically interrupting the scanning by said beam during line scansion, said interrupting means comprising a reference generator having a frequency which is an odd multiple of one-half the line frequency connected to a gating pulse generator, said gating pulse generator having a frequency which is a multiple of said reference generator, and gating means connected to said gating pulse generator; and means for so synchronizing said deflecting means and said interrupting means that one corresponding elemental area in each group is scanned during one frame and different corresponding elemental areas in said groups are scanned during successive frames.

40. The invention claimed in claim 39 in which the interrupting means comprises means for interrupting the scanning beam.

41. The invention claimed in claim 39 in which the interrupting means comprises means for interrupting the horizontal deflection of the beam.

42. A high definition television system comprising a scanner, line and field frequency generators connected to said scanner, a sampler connected to said scanner, a reference generator having a frequency which is an odd multiple of one-half the frequency of said line generator connected to a gating pulse generator, said gating pulse generator having a frequency which is a multiple of said reference generators, means for gating said sampler with pulses from said gating pulse generator, said gating means including means for changing the phase of the gating pulses on successive frames, a low pass filter connected to receive the output of said sampler, means for transmitting the video signal output from said low pass filter, and sync pulses from said line, field and reference generators, and a receiver for receiving the transmitted signals, said receiver including means for deriving a demodulated video signal, a second gating pulse generator having the same frequency as said first mentioned gating pulse generator and synchronized therewith, second gating means including means for changing the phase of the gating pulses from said second gating pulse generator on successive frames and synchronized with said first mentioned gating means, a picture tube, and means including vertical and horizontal deflection means and means using signals from said video signal deriving means and said second gating means to reproduce picture elements on the screen of said picture tube only during gating pulses from said second gating means.

References Cited in the file of this patent

UNITED STATES PATENTS

| | | |
|---|---|---|
| 2,657,257 | Lesti | Oct. 27, 1953 |
| 2,683,770 | Kalfaian | July 13, 1954 |
| 2,690,471 | France | Sept. 28, 1954 |